United States Patent
Gupta et al.

(10) Patent No.: US 10,270,246 B2
(45) Date of Patent: Apr. 23, 2019

(54) START-UP OF HVDC NETWORKS

(71) Applicant: General Electric Technology GmbH, Baden (CH)

(72) Inventors: Robin Gupta, Stafford (GB); Carl Barker, Stone (GB); Andrzej Adamczyk, Stafford (GB)

(73) Assignee: GENERAL ELECTRIC TECHNOLOGY GMBH, Baden (CH)

( * ) Notice: Subject to any disclaimer, the term of this patent is extended or adjusted under 35 U.S.C. 154(b) by 0 days.

(21) Appl. No.: 15/558,801

(22) PCT Filed: Mar. 11, 2016

(86) PCT No.: PCT/EP2016/055246
§ 371 (c)(1),
(2) Date: Sep. 15, 2017

(87) PCT Pub. No.: WO2016/146507
PCT Pub. Date: Sep. 22, 2016

(65) Prior Publication Data
US 2018/0076619 A1    Mar. 15, 2018

(30) Foreign Application Priority Data
Mar. 16, 2015 (EP) .................... 15159219

(51) Int. Cl.
*H02J 1/02* (2006.01)
*H02J 3/36* (2006.01)

(52) U.S. Cl.
CPC .................. *H02J 1/02* (2013.01); *H02J 3/36* (2013.01); *H02J 2003/365* (2013.01); *Y02E 60/60* (2013.01)

(58) Field of Classification Search
CPC ........... H02J 1/02; H02J 3/36; H02J 2003/365
See application file for complete search history.

(56) References Cited

U.S. PATENT DOCUMENTS

| 4,638,415 A | 1/1987 | Neupauer |
| 5,677,852 A * | 10/1997 | Juhlin ................ H02J 3/24 |
| | | 702/117 |
| 2009/0219737 A1* | 9/2009 | Bjorklund .......... H02J 3/36 |
| | | 363/35 |

FOREIGN PATENT DOCUMENTS

| EP | 2 827 158 A2 | 1/2015 |
| WO | 2007/084041 A1 | 7/2007 |
| WO | 2014/189675 A2 | 11/2014 |

OTHER PUBLICATIONS

Extended European Search Report and Opinion issued in connection with corresponding EP Application No. 15159219.3 dated Jul. 30, 2015.

(Continued)

*Primary Examiner* — Jue Zhang
(74) *Attorney, Agent, or Firm* — GE Global Patent Operation; Scott R. Stanley

(57) ABSTRACT

A method and apparatus for controlling a voltage source converter to energize a DC link. A voltage order generating module generates a voltage order for controlling the voltage source converter to generate a DC voltage on the DC link. An oscillation damping module monitors the DC current flow to determine an indication of current oscillation and the voltage order is based on a voltage reference signal which is modulated by the indication of current oscillation to provide oscillation damping.

13 Claims, 3 Drawing Sheets

(56) References Cited

OTHER PUBLICATIONS

International Search Report and Written Opinion issued in connection with corresponding PCT Application No. PCT/EP2016/055246 dated May 27, 2016.
International Preliminary Report on Patentability issued in connection with corresponding PCT Application No. PCT/EP2016/055246 dated Sep. 19, 2017.

* cited by examiner

START-UP OF HVDC NETWORKS

FIELD OF INVENTION

Embodiments of the invention relate to methods and apparatus for start-up of voltage source converters forming part of a high voltage power transmission/distribution network and especially for methods and apparatus for energising a DC link between voltage source converters, for example on initialisation of a DC link or re-start after a fault condition.

BACKGROUND OF THE INVENTION

HVDC (high-voltage direct current) electrical power transmission uses direct current for the transmission of electrical power. This is an alternative to alternating current electrical power transmission which is more common. There are a number of benefits to using HVDC electrical power transmission. HVDC is particularly useful for power transmission over long distances and/or interconnecting alternating current (AC) networks that operate at different frequencies.

A first station may therefore transmit electrical energy to a second station over one or more DC transmission lines, e.g. overhead lines or subsea or buried cables. The first station may generate the DC supply by conversion from a received AC input supply. The second station then typically provides conversion back from DC to AC. Each of the first and second stations may therefore typically comprise a converter for converting from AC to DC or vice versa.

Initially HVDC power transmission systems tended to be implemented for point-to-point transmission, i.e. just from the first station to the second station. Increasingly however it is being proposed to implement HVDC power transmission on a mesh-network or DC grid comprising a plurality of DC transmission paths connecting more than two voltage converters. Such DC networks are useful, for example, in applications such as electrical power generation from renewable sources such as wind farms where there may be a plurality of sources that may be geographically remote.

To date most HVDC transmission systems have been based on line commutated converters (LCCs), for example such as a six-pulse bridge converter using thyristor valves. LCCs use elements such as thyristors that can be turned on by appropriate trigger signals and remain conducting as long as they are forward biased.

Increasingly however voltage source converters (VSCs) are being proposed for use in HVDC transmission. VSCs use switching elements such as insulated-gate bipolar transistors (IGBTs) that can be controllably turned on and turned off independently of any connected AC system. VSCs are thus sometime referred to as self-commutating converters.

Various designs are VSC are known. In one form of known VSC, often referred to as a six pulse bridge, each valve connecting an AC terminal to a DC terminal comprises a set of series connected switching elements, typically IGBTs, each IGBT connected with an antiparallel diode. The IGBTs of the valve are switched together to connect or disconnect the relevant AC and DC terminals, with the valves of a given phase limb (i.e. the two valves that connect the two DC terminals respectively to the same AC terminal) being switched in antiphase. By using a pulse width modulated (PWM) type switching scheme for each arm, conversion between AC and DC voltage can be achieved.

In another known type of VSC, referred to a modular multilevel converter (MMC), each valve comprises a series of cells connected in series, each cell comprising an energy storage element, such as a capacitor, and a switch arrangement that can be controlled so as to either connect the energy storage element in series between the terminals of the cell or bypass the energy storage element. The cells or sub-modules of a valve are controlled to connect or bypass their respective energy storage element at different times so as to vary over the time the voltage difference across the valve. By using a relatively large number of sub-modules and timing the switching appropriately the valve can synthesise a stepped waveform that approximates to a sine wave and which contain low level of harmonic distortion. As will be understood by one skilled in the art there are various designs of MMC. For example an MMC may be a half-bridge MMC or a full bridge MMC. In a half-bridge MMC the energy storage element of a cell or sub-module is connected with a half-bridge switch arrangement, which allows the energy storage element to be bypassed or connected to provide a voltage of a given polarity at the terminals of the cell. In a full-bridge MMC the energy storage element of a cell or sub-module is connected with a full-bridge switch arrangement, which allows the energy storage element to be bypassed or connected to provide a voltage of either polarity at the terminals of the cell.

In normal use the VSCs of the HVDC stations are typically controlled with reference to the AC waveform of the relevant connected AC network to achieve a desired power flow. One VSC may operated in voltage control to control the voltage of the DC lines, with another VSC being controlled in a power control to control power flow.

In use the DC lines are thus charged to the relevant operating DC voltages. On initial start-up of the DC network, or in some instances on re-start after a fault, it can therefore be necessary to charge the DC lines up to the operating voltages.

Before start-up of the DC link, or following some fault conditions, the VSCs connected to the DC network may be in a blocked, non-operational, state. Typically one VSC is used as an energising converter and is de-blocked in voltage control mode and used to charge the DC line(s), with the other converter(s) remaining in the blocked state. The energising converter thus charges a DC line at its proximal end where the DC line may effectively be open-circuited at its distal end. This can result in voltage oscillations in the DC line that can result in a voltage magnitude at the distal end that is greater than 1 p.u. and which may significantly exceed the rated voltage of the DC link, which is undesirable.

SUMMARY OF INVENTION

The embodiments of the present disclosure provide methods and apparatus which at least mitigate such problems of oscillation.

Thus according to embodiments of the present invention there is provided a method of controlling a voltage source converter to energise a DC link comprising: controlling the voltage source converter to generate a DC voltage on the DC link based on a voltage order; and monitoring DC current flow to determine an indication of current oscillation; wherein the voltage order is based on a voltage reference signal which is modulated by said indication of current oscillation to provide oscillation damping.

The method thus controls the VSC which is energising the DC link by generating a voltage order based on a voltage reference signal, which may in particular be a time varying voltage reference signal. Using a time varying voltage reference signal can help reduce the extent of any voltage oscillation as the voltage of the DC link is increased over time. In addition the DC current flow is monitored to determine the extent of any oscillations in current and the voltage reference signal is modulated based on the indication of current oscillation to provide the voltage order. The voltage order is thus effectively modulated to damp any oscillations in DC current at the VSC, which has the effect of damping any oscillations in voltage of the DC link, as will be explained in more detail later.

The indication of current oscillation may be determined by filtering a signal indicative of DC current flow, e.g. by filtering the DC current flow to identify an oscillation component. Filtering the signal indicative of DC current flow may comprise applying at least one of a band-pass filter and/or a high-pass filter. The pass-band or cut-off frequency of the filter(s) is/are chosen to isolate the oscillation component.

In some embodiments the indication of current oscillation may be compared to a reference current value.

A current controller may receive the indication of current oscillation and determine a damping control signal for modulating said first time varying voltage reference signal. In some embodiments the current controller may be a proportional-integral controller, although other types of controller may be used.

In some embodiments the value of the damping control signal may be controlled so as not to exceed a predetermined limit. The predetermined limit may be fixed or, in some embodiments, the predetermined limit may vary over time.

As mentioned the voltage reference signal may be a time varying voltage reference signal. The time varying voltage reference signal may comprise a ramp signal. The ramp signal may ramp from an initial value corresponding to the voltage of the DC link when the voltage source converter is initially de-blocked to a final value corresponding to the nominal voltage of the DC link.

In some embodiments the slope of the ramp signal varies over time. Thus the rate of change of the time varying voltage reference signal may change over time. For instance the slope of the ramp signal may decrease over time. As will be explained in more detail later a faster rate of change may be tolerated during the first stages of energising the DC link. As the voltage at the proximal end of the DC link nears the nominal voltage the rate of change may be reduced so that the magnitude of any voltage oscillation at the distal end is reduced and may, for example, by maintained within an acceptable safe operating limit.

In one aspect there is provided a method of starting an HVDC system comprising a first voltage source converter connected to at least a second voltage source converter by a DC link. The method may comprise: de-blocking the first voltage source converter and controlling the first voltage source converter according to the method as described in any of the variants above whilst maintaining the second voltage source converter in a blocked state; and subsequently de-blocking the second voltage source converter.

In another aspect there is provided machine readable code stored on a non-transitory storage medium, the code comprising instructions for causing a suitable processor to perform the method of controlling a VSC of any of the variants described above.

Aspects also relate to a control apparatus for controlling a voltage source converter to energise a DC link comprising:

a voltage order generating module for generating a voltage order for controlling the voltage source converter to generate a DC voltage on the DC link;

the voltage order generating module being configured to:
monitor DC current flow to determine an indication of current oscillation; and
generate the voltage order based on a voltage reference signal which is modulated by said indication of current oscillation to provide oscillation damping.

The control apparatus offers all of the same advantages and may be implemented in all of the same variants as discussed with reference to the first aspect of embodiments of the invention.

The voltage order generating module may comprise an oscillation damping module for modulating the voltage reference signal based on the indication of current oscillation.

The oscillation damping module may comprise at least one filter configured to receive and filter a signal indicative of DC current flow. The output of the filter may be the indication of current oscillation. The at least one filter may comprise a band-pass filter and/or a high-pass filter.

The control apparatus may comprise a current controller configured to receive the indication of current oscillation and determine a damping control signal for modulating the time varying voltage reference signal. The current controller may be part of the oscillation damping module. The current controller may comprise a proportional-integral controller, although other types of controller may be used.

In some embodiments the control apparatus may comprise a limiter for limiting the value of the damping control signal so as not to exceed a predetermined limit. The predetermined limit may be fixed or, in some embodiments, the predetermined limit may vary over time.

The control apparatus may comprise a voltage reference signal generating module for generating a time varying voltage reference signal. The time varying voltage reference signal may comprise a ramp signal, in which case the control apparatus may comprise a ramp generator. The voltage reference signal may ramp from an initial value corresponding to the voltage of the DC link when the voltage source converter is initially de-blocked to a final value corresponding to the nominal voltage of the DC link. An adder may be configured to add the output from the ramp generator to a value corresponding to the starting value. The ramp generator may generate a ramp signal with a slope that varies over time.

BRIEF DESCRIPTION OF THE DRAWINGS

Embodiments of the invention will now be described by way of example only, with reference to the following drawings, of which.

DETAILED DESCRIPTION OF THE INVENTION

Embodiments of the present invention relate to methods and apparatus for control of voltage source converters (VSCs) for HVDC power transmission, and especially for start-up of a DC link between two or more VSCs that mitigates the problems of voltage oscillation on the DC link.

Figure 1:
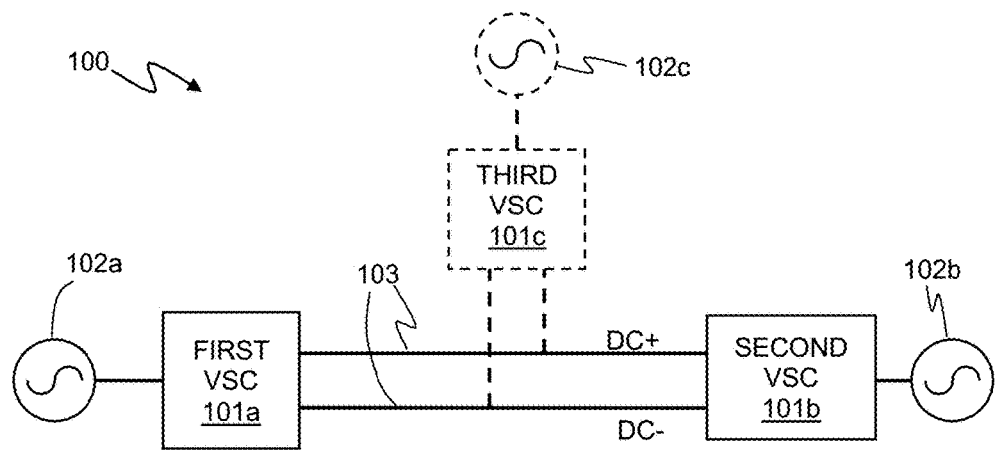
FIG. 1 illustrates an example of an HVDC power transmission/distribution network.

FIG. 1 illustrates an example of an HVDC power transmission/distribution network 100. A first VSC 101a is connected to a first AC system 102a and a second VSC 101b is connected to a second AC system 101b. The first and second VSCs are connected by a DC link 103, which is this example comprises DC lines at opposite polarities DC+ and DC−. It will be understood however that other arrangements are possible, including unipolar transmission. The first and second VSCs may be part of converter stations which, in some installations, may be relatively far apart. Thus the DC link 103 may comprise transmission lines, such as overhead transmission lines or buried or subsea cables, that may be many kilometers in length in some examples.

The HVDC network may comprise a point-to-point link with just the first and second VSCs 101a and 101b. However in some applications there may be more than two VSCs all connected to the same DC grid. Thus as illustrated in FIG. 1 there may be at least a third VSC 101c connected to at least one of the first and second VSCs 101a and 101b by DC transmission lines. The third VSC 101c is itself connected to an AC system 102c, which in some embodiments may be the same as one of the AC systems 102a or 102b or a different AC system.

At times there may be a need to start or restart the HVDC network 100, for example on initial start-up of the network or following a fault. Typically to start the HVDC network at least one of the AC networks will be operational but all the VSCs connected to the DC link 103 will be in a blocked state and non-operational, as will be understood by one skilled in the art.

In a typical start-up process one of the VSCs, say the first VSC 101a, is used to charge the DC link before the other VSCs are started. Thus any DC breakers associated with the first VSC 101a or its connection to the DC link may be closed. The first VSC 101a may then be de-blocked and started in a voltage control mode to energise the transmission lines of the DC link 103. The other VSC(s) connected to the DC link 103 is/are maintained in a blocked state, at least initially. This means that a DC voltage is generated at the proximal end of the DC link to the first VSC 101a. The other end(s) of the DC link, i.e. the distal ends at the blocked VSC(s), is/are effectively open circuit.

It has been found that such a start-up scheme can lead to undesirable voltage oscillations in the DC link and especially at a distal end of the DC link.

FIG. 2 illustrates the DC voltages experienced at the energising converter and at the blocked converter for a simulated start-up of a point-to-point HVDC system, e.g. with a first VSC 101a and a second VSC 101b. In this example the first VSC 101a is de-blocked and used to charge the DC link whilst the second VSC 101b remains in a blocked state.

Figure 2A:
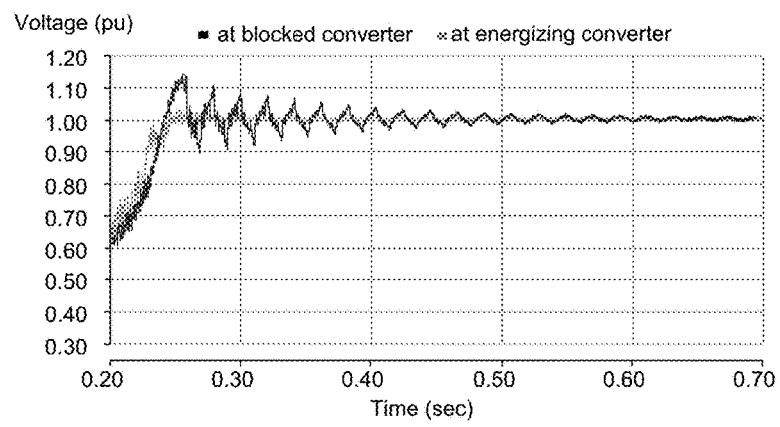
FIGS. 2A and 2B illustrate voltage oscillations that may be experienced when energising a DC link with a half bridge MMC VSC and a full bridge MMC VSC respectively.

FIG. 2A shows the simulated results of DC voltage (p.u.) against time where the first VSC 101a, i.e. the energising converter, is a half-bridge MMC. For a half-bridge MMC the switching arrangement is such that the DC link 103 can be charged to the magnitude of the peak AC voltage received at the first VSC, as the DC lines can be charged via the diodes of the half-bridge cells. Thus at the instant that the first VSC is de-blocked the DC link will be partially charged to this peak AC voltage. The voltage of the DC link may then be raised to the nominal operating voltage by operation of the first VSC. As can be seen from FIG. 2A the voltage of the DC link at the energising converter rises from the initial partially charged voltage to the nominal voltage. However this leads to a significant voltage oscillation at the distal end of the DC link, i.e. at the blocked second VSC 101b. It can be seen from FIG. 2A that this voltage oscillation can result in a voltage magnitude that is significantly greater than the nominal voltage of the DC link. This is undesirable.

Figure 2B:
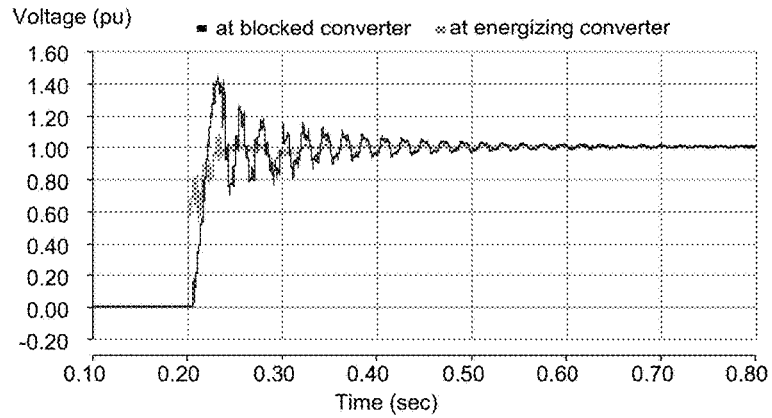

FIG. 2B illustrates shows the simulated results of DC voltage (p.u.) against time where the first VSC 101a, i.e. the energising converter, is a full-bridge MMC. In this example the at the instant that the first VSC is de-blocked the DC link will be at substantially zero volts and thus the voltage of the DC link at the proximal end, i.e. at the first VSC 101a, ramps from zero to nominal. It can be seen from FIG. 2B that this results in a significant voltage oscillation at the distal end of the DC link, with a peak magnitude that greatly exceeds the nominal DC voltage.

To reduce the extent of the voltage oscillation it is possible to ramp the voltage at the first VSC, i.e. the energising converter, up from a starting value to the nominal value over time. By more gradually increasing the voltage of the DC line the oscillations experienced at the distal end may be reduced. However to keep the voltage magnitude within acceptable limits may require the use of a relatively very gradual ramp in voltage, which consequently can require a relatively long time to reach the nominal voltage. In re-starting an HVDC network after a fault there is generally a desire to return to normal operation as fast as possible and the time required for a suitable voltage ramp, especially for a full-bridge VSC where the starting voltage is zero, may be unduly long.

Embodiments of the present invention therefore provide methods and apparatus for controlling a voltage source converter to energise a DC link that at least mitigates at least some of the problems mentioned above. According to one embodiment the method comprises controlling the voltage source converter to generate a DC voltage on the DC link based on a voltage order; and monitoring DC current flow to determine an indication of current oscillation. The voltage order is based on a voltage reference signal, which in this embodiment is a time varying voltage reference signal, which is modulated by the indication of current oscillation to provide oscillation damping.

It has been recognised that during such a start-up scheme there may be oscillations in DC current at the energising converter, e.g. the first VSC, and oscillations in voltage at the distal end of the DC link, i.e. at the second VSC. The voltage oscillation at the distal end of the DC link can be reduced by damping oscillations in current at the proximal end, i.e. at the energising converter. Thus the DC current at the first VSC, i.e. the energising VSC, is monitored to determine the extent of any oscillations in DC current. A current control loop then provides a damping control signal for modifying the voltage order used to control the voltage source converter.

Figure 3:
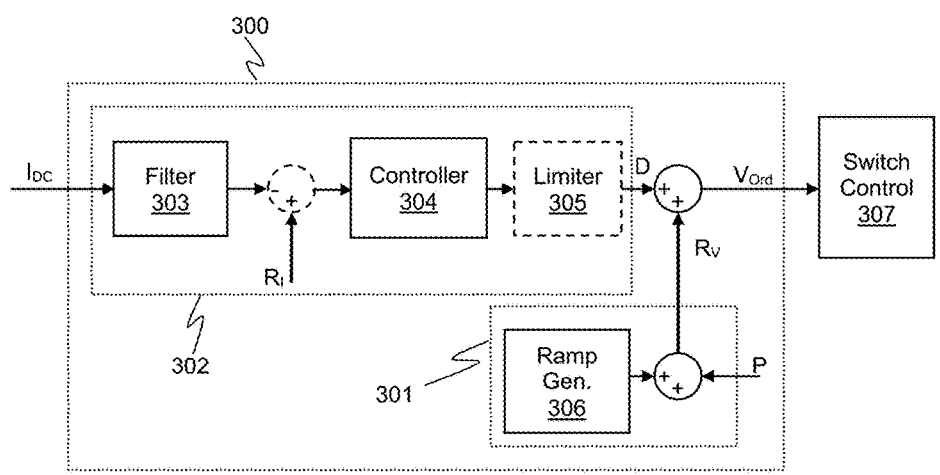
FIG. 3 illustrates a control apparatus for a VSC according to an embodiment of the invention.

FIG. 3 illustrates one embodiment of the invention. FIG. 3 illustrates a voltage order generating module 300 for generating a voltage order $V_{ord}$ for controlling the voltage of the VSC during start-up and charging of the DC link. The voltage order is based on a voltage reference signal $R_V$. As will be explained in more detail below the voltage reference signal $R_V$ is, in an embodiment, a time varying signal, such a ramp signal, so as to increase the voltage generated by the first VSC over time from a starting voltage, on de-blocking of the VSC, to the nominal voltage. The voltage order generating module may therefore have a voltage reference generating module 301 for generating the voltage reference signal $R_V$.

There is also an oscillation damping module 302, e.g. a control loop, for modulating the voltage order $V_{ord}$ in order to provide damping of any voltage oscillations. In the example illustrated in FIG. 3 the oscillation damping module determines the extent of any oscillations in DC current flow at the first VSC and modulates the voltage reference signal $R_V$ to provide the voltage order $V_{ord}$.

To provide the indication of current oscillation the DC current flow at the first VSC may be monitored and filtered by a filter 303 to isolate the component of any current oscillations. The filter 303 may be a band-pass filter with a pass band at the frequencies of interest for the expected current oscillations. Additionally or alternatively a high-pass filter could be used, for example with a cut-off frequency of the order of about a decade lower than the expected oscillation frequency.

In some embodiments, the difference between the oscillating current component, e.g. the output of the filter 303, and a reference current value $R_I$ is used as the indication of current oscillation. For start-up of the DC link the reference current value will typically be zero and thus if the oscillation damping module 302 is used only for start-up the output of the filter may be used directly to provide the indication of current oscillation.

This indication of the DC current oscillation may then be input to a current controller 304. The current controller determines an appropriate damping control signal D for modulating the time varying reference signal $R_V$ to give a voltage order $V_{ord}$ which provides damping. The current controller may for example be a proportional-integral (PI) controller as would be understood by one skilled in the art. Other types of current controller, i.e. other control techniques, could be used instead however. The input to the current controller 304 is effectively an error signal indicating the extent of any unwanted current oscillation in the DC current. The controller thus determines a suitable correction signal to be applied to the voltage order. The current controller is thus part of an oscillation damping current control feedback loop.

In some embodiments it may be desirable to limit the amount of voltage correction applied for oscillation damping. For example for a half-bridge MMC the voltage order should not be lower than the peak voltage of the AC voltage received by the VSC. Thus the amount of voltage correction applied may be limited by a limiter 305 so that the resultant voltage order remains valid. In other words the maximum (or minimum depending on the exact implementation) magnitude of the damping control signal D may be limited. If the damping control signal D does not exceed the relevant limit then it may be used directly, however if it exceeds the relevant limit then the signal may be limited to the maximum permissible value.

In some embodiments the limit(s) applied by limiter 305 may be fixed, i.e. non-varying, for example predetermined based on the particular VSC. In some embodiments however the limit(s) applied by limiter 305 may vary dynamically over time. For instance the limiter may allow a greater amount of voltage correction during the start-up process than would be applied in subsequent steady state operation.

The oscillation damping module 302 thus determines the extent of any oscillation in DC current at the first VSC and determines a suitable damping control signal D that modulates the voltage order $V_{ord}$ to damp the current oscillations and hence the voltage oscillations at the distal end of the DC link.

In the example of FIG. 3 the voltage damping control signal is combined with the voltage reference signal $R_V$ to provide the voltage order, e.g. by adding the two signals. Conveniently the voltage reference signal is a time varying signal that has a starting value that corresponds to the initial voltage of the DC link when the first VSC is de-blocked and which increases over time to the a value that corresponds to the nominal operating voltage. Increasing the voltage of the DC link more gradually over time reduces the amount of oscillation at the distal end of the DC link as described above. However the presence of the oscillation damping module 302 means that an overall time to reach nominal voltage can be quicker than otherwise would be the case for a given tolerance of voltage oscillation. In other words the combination of the oscillation damping module with a time varying voltage reference signal provides good control over any voltage oscillation whilst also reaching nominal operating voltage relatively quickly.

In some embodiments the time varying voltage reference signal may be a ramp signal that ramps from the starting value to the value that corresponds to the nominal operating voltage. In the example of FIG. 3 the voltage reference generation module 301 therefore comprises a ramp generator 306 which generates a suitable ramp signal which is added to a value, P, indicative of the starting voltage, i.e. the pre-charged voltage, of the DC link when the VSC is de-blocked, which for example may be zero for a full bridge MMC and may be equal to the peak AC voltage for a half bridge MMC.

The ramp generator may generate a ramp with a single continuous slope, i.e. rate of increase in value with time, from the starting value to the nominal value. FIG. 4a illustrates for example how the voltage reference signal $R_V$ may vary over time for a half-bridge MMC. The reference signal starts at the value P, indicative of the voltage to which the DC link has been pre-charged. The voltage reference signal value then ramps continuously over a certain time until the nominal voltage is reached at a time $t_n$. For a full bridge MMC the starting voltage may be zero and thus the voltage reference signal may ramp continuously from zero to the nominal voltage at a time $t_n$, as illustrated in FIG. 4b. It will be clear that a greater rate of increase, i.e. slope, would be needed for the reference signal for a full bridge MMC compared to a half-bridge MMC to reach nominal voltage in the same time, $t_n$, from de-blocking the converter.

In some embodiments however the rate of increase may vary over time, i.e. the slope of the ramp signal may vary over time. Using a time varying signal where the rate of increase varies over time may help reduce the overall time to reach the nominal operating voltage.

For example the slope (or gradient) of the ramp signal may decrease over time. In other words when the first VSC is initially de-blocked a relatively high slope, i.e. a relatively fast rate of increase with time, may be used. As mentioned above a faster rate of change may lead to a greater amount of voltage oscillation, but in the early stages of the start-up process the voltage will be oscillating about a relatively low value (i.e. the DC component of the voltage will be relatively low) and thus the peak voltage magnitude at the distal end of the DC link is unlike to exceed the nominal operating voltage. As the DC component of the voltage increases however the rate of increase may be reduced so as to reduce the extent of any voltage oscillation so as to allow the oscillation damping module to significantly damp any oscillations that may otherwise occur.

FIG. 4c illustrates a time varying voltage reference signal with multiple slopes as may be generated for a full bridge MMC. Initially from when the converter is de-blocked to a time $t_1$ (which may be predetermined in terms of time or equivalently a predetermined voltage value) the voltage reference signal ramps up with a first slope which is relatively high, i.e. corresponds to a relatively fast rate of increase of voltage with time. At time $t_1$ the slope decreases to a slower rate of increase. At time $t_2$ the slope decreases again. This means that as the voltage order approaches the nominal operating voltage the rate of increase of voltage is relatively slow and thus unlikely to induce more significant oscillations. At time $t_3$ the nominal operating voltage is reached. Using multiple slopes in this way may allow the nominal voltage to be reached faster and/or with lower magnitude voltage oscillations than would be the case using a single ramp slope.

It should be noted that the use of a time varying voltage order where the rate of change of the voltage order varies over time during start-up of an HVDC link for energising a DC link is useful in its own right. Thus in some alternative examples a time varying voltage order, where the rate of change varies over time, e.g. using a voltage reference signal with a plurality of ramp slopes, may be used in the absence of an oscillation damping module. Thus a voltage order generating module may generate a voltage order based on a time varying voltage reference signal where the rate of increase of the voltage reference signal reduces over time during the start-up process.

Figure 4:
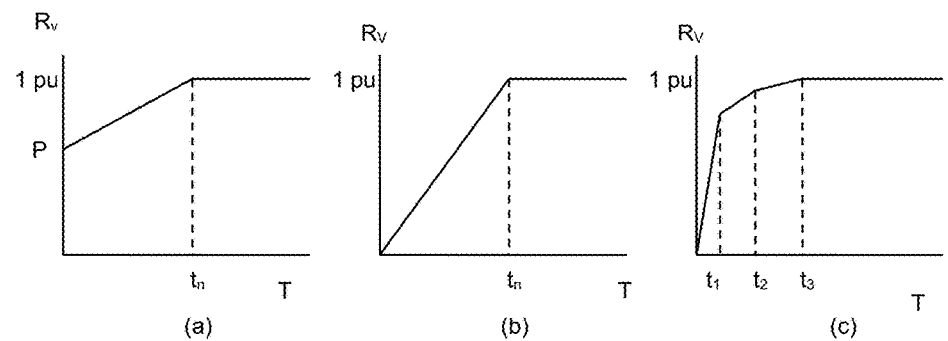
FIGS. 4A, 4B and 4C illustrate different examples of voltage reference signals.

It will of course be appreciated that FIG. 4 illustrates periods of substantially continuous slope. It would alternatively be possible to continually vary the rate of change of the voltage reference signal such that a plot of voltage reference signal value with time would be substantially curved. The particular function of change of value of voltage reference signal with time may be chosen as desired and in some embodiments may be configurable in use.

In some embodiments the voltage reference signal value could be changed in a stepwise fashion for at least part of the period over which it varies. The average rate of change over time could be kept constant to provide effectively a single slope or in some embodiments the value of the step change and/or period between step changes could be varied to provide a varying rate of increase.

It will also be appreciated that the time varying voltage reference signal has been described as increasing in value over time, it would of course be possible to have a negative ramp or decreasing value which is for example subtracted from a value to provide the voltage order. The time varying voltage reference signal could also in some embodiment be a combination of positive and negative ramp rates.

It should also be noted that whilst the embodiments described above are described with reference to a time varying voltage reference signal the principles are also applicable to a constant value voltage reference signal. In other words a voltage order may be generated based on a target voltage reference value which is substantially constant as modulated by an oscillation damping current control loop.

As mentioned above the voltage reference signal is then combined with the damping control signal and used to generate the voltage order $V_{ord}$. The voltage order is then provided to the switching control 307 of the VSC to control the operation of the VSC.

It will therefore be understood that the voltage order generating module 300 illustrated in FIG. 3 is thus part of the control apparatus of the VSC that control the switching of the cells of the VSC. The methods of embodiments of the present invention thus control the operation of the VSC itself, and do not require external component such as active filters.

It should be noted that as used herein the term "module" in reference to the control apparatus of the VSC (e.g. the voltage order generating module 300, the oscillation damping module 302 or voltage reference generating module 301) refers to a functional unit that performs the stated purpose in use. Unless otherwise specified a module may be implemented as a hardware module or a software module or a combination of both. By software module is meant a module that is implemented by a suitable processor performing instructions stored as machine readable code. The module may comprise at least some dedicated circuitry and/or a dedicated processor but additionally or alternatively may make use of some generic processor or FPGA array or the like. Some elements may be shared between the modules and/or between a module illustrated in FIG. 3 and some other component of the VSC and the reference to a module does not require that the components of the module are physically co-located. Likewise the filter 303, current controller 304, limiter 305, and ramp generator 306 may each be implemented by hardware or software or a combination of both and may comprise at least some dedicated circuitry and/or a dedicated processor but additionally or alternatively may make use of some generic processor or FPGA array or the like.

To demonstrate the principles of the various embodiments start-up of a point-to-point HVDC link between a first VSC and a second VSC was simulated, e.g. a link between VSC 101a and VSC 101b illustrated in FIG. 1, where the energising VSC was started as described above with respect to FIG. 3.

Figure 5A:
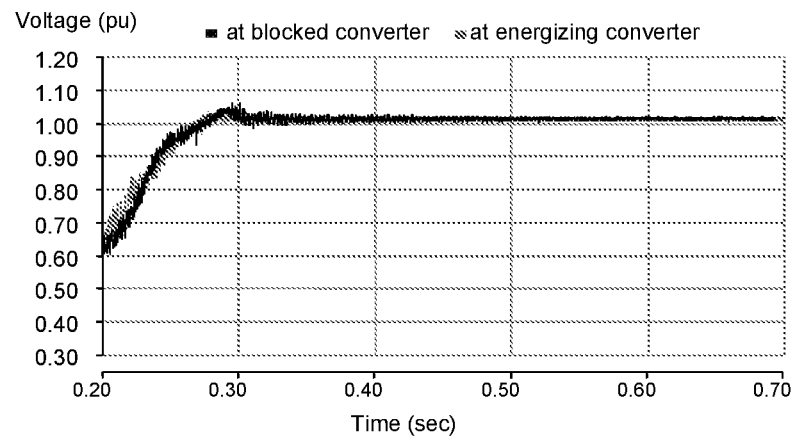
FIGS. 5A, 5B and 5C illustrate simulated DC voltages that would be experienced by embodiments of the present invention.

FIG. 5A illustrates how the DC voltage varies over time where the first VSC, which is de-blocked and used to energise the DC link, is a half bridge MMC (and the second VSC remains blocked). It can be seen that the extent of any voltage oscillation is substantially reduced compared to the result illustrated in FIG. 2A and the maximum voltage magnitude experienced is not substantially greater than the nominal operating voltage.

Figure 5B:
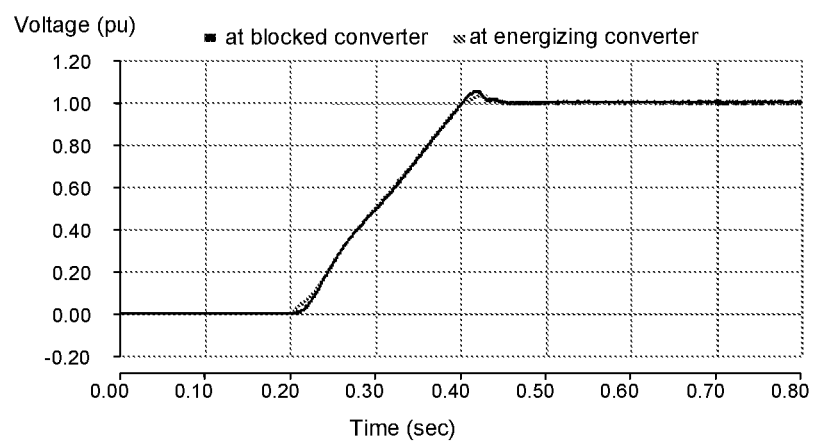
Figure 5C:
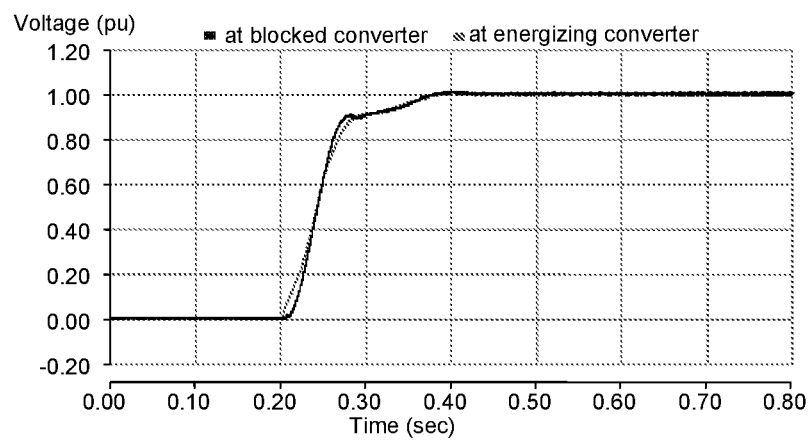

FIG. 5b illustrates the simulated results where the first VSC, which is de-blocked and used to energise the DC link, is a full bridge MMC and a single slope is used for the voltage reference signal. Again it can be seen that the extent of any voltage oscillation is substantially reduced compared to the result illustrated in FIG. 2B and the maximum voltage magnitude experienced is not substantially greater than the nominal operating voltage. FIG. 5c illustrates the results for a full bridge MMC but using a voltage reference signal with multiple slopes. In both FIGS. 5b and 5c the first VSC is de-blocked and the nominal voltage is reached a short time later. However the use of two slopes for the voltage reference signal can be seen in FIG. 5c to result in a further reduction of the maximum DC voltage experienced at the distal end of the link.

In general therefore embodiments of the invention relate to methods and apparatus for controlling a VSC that allow for relatively rapid charging of a DC link for HVDC. By using a time varying voltage reference signal to generate a voltage order and by also applying current oscillation damping the peak voltage magnitude of the DC link during charging can be kept with acceptable limits whilst not requiring an unduly slow start-up process. The use of multiple slopes for the voltage reference signal can help reduce the time required to reach nominal voltage whilst avoiding voltages significantly above the nominal voltage.

Embodiments also relate to a high-voltage direct current transmission system comprising at least first and second voltage source converters connected to a DC link. On start-up or re-start the first VSC may be de-blocked and operated as described above whilst the second VSC is maintained in a blocked state. After the DC link has been charged the second VSC (and any other VSCs) may be de-blocked.

The embodiments above have been described mainly with reference to MMC type VSCs. The methods and apparatus are applicable to any type of VSC however as the method simply generates a suitable voltage order.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single feature or other unit may fulfil the functions of several units recited in the claims. Any reference signs in the claims shall not be construed so as to limit their scope.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of controlling a voltage source converter to energise a DC link comprising:
   controlling the voltage source converter to generate a DC voltage on the DC link based on a voltage order; and
   monitoring DC current flow to determine an indication of current oscillation;
   wherein the voltage order is based on a time varying voltage reference signal that increases from an initial value corresponding to the voltage of the DC link when the voltage source converter is deblocked to a final value corresponding to the nominal operating voltage of the DC link, wherein the time varying voltage reference signal is modulated by said indication of current oscillation to provide oscillation damping.

2. The method as claimed in claim 1 wherein the indication of current oscillation is determined by filtering a signal indicative of DC current flow.

3. The method as claimed in claim 2 wherein filtering the signal indicative of DC current flow comprises applying at least one of a band-pass filter and a high-pass filter.

4. The method as claimed in claim 1 wherein a current controller receives the indication of current oscillation and determines a damping control signal for modulating said voltage reference signal.

5. The method as claimed in claim 4 wherein the value of the damping control signal is controlled so as not to exceed a predetermined limit.

6. The method as claimed in claim 5 wherein the predetermined limit varies over time.

7. The method as claimed in claim 1 wherein the time varying voltage reference signal comprises a ramp signal.

8. The method as claimed in claim 7 wherein the slope of the ramp signal varies over time.

9. The method as claimed in claim 8 wherein the slope of the ramp signal decreases over time.

10. A method of starting an HVDC system comprising a first voltage source converter connected to at least a second voltage source converter by a DC link, the method comprising:
    de-blocking the first voltage source converter and controlling the first voltage source converter according to the method of claim 1 while maintaining the second voltage source converter in a blocked state; and
    subsequently de-blocking the second voltage source converter.

11. A machine readable code stored on a non-transitory storage medium, the code comprising instructions for causing a suitable processor to perform the method of claim 1.

12. A control apparatus for controlling a voltage source converter to energise a DC link comprising:
    a voltage order generating module for generating a voltage order for controlling the voltage source converter to generate a DC voltage on the DC link;
    the voltage order generating module being configured to:
    monitor DC current flow to determine an indication of current oscillation; and
    generate the voltage order based on a time varying voltage reference signal that increases from an initial value corresponding to the voltage of the DC link when the voltage source converter is deblocked to a final value corresponding to the nominal operating voltage of the DC link, the time varying voltage reference signal being modulated by said indication of current oscillation to provide oscillation damping.

13. The control apparatus as claimed in claim 12 wherein said control apparatus comprises a current controller configured to receive the indication of current oscillation and determine a damping control signal for modulating the voltage reference signal.

* * * * *